Figure 1:
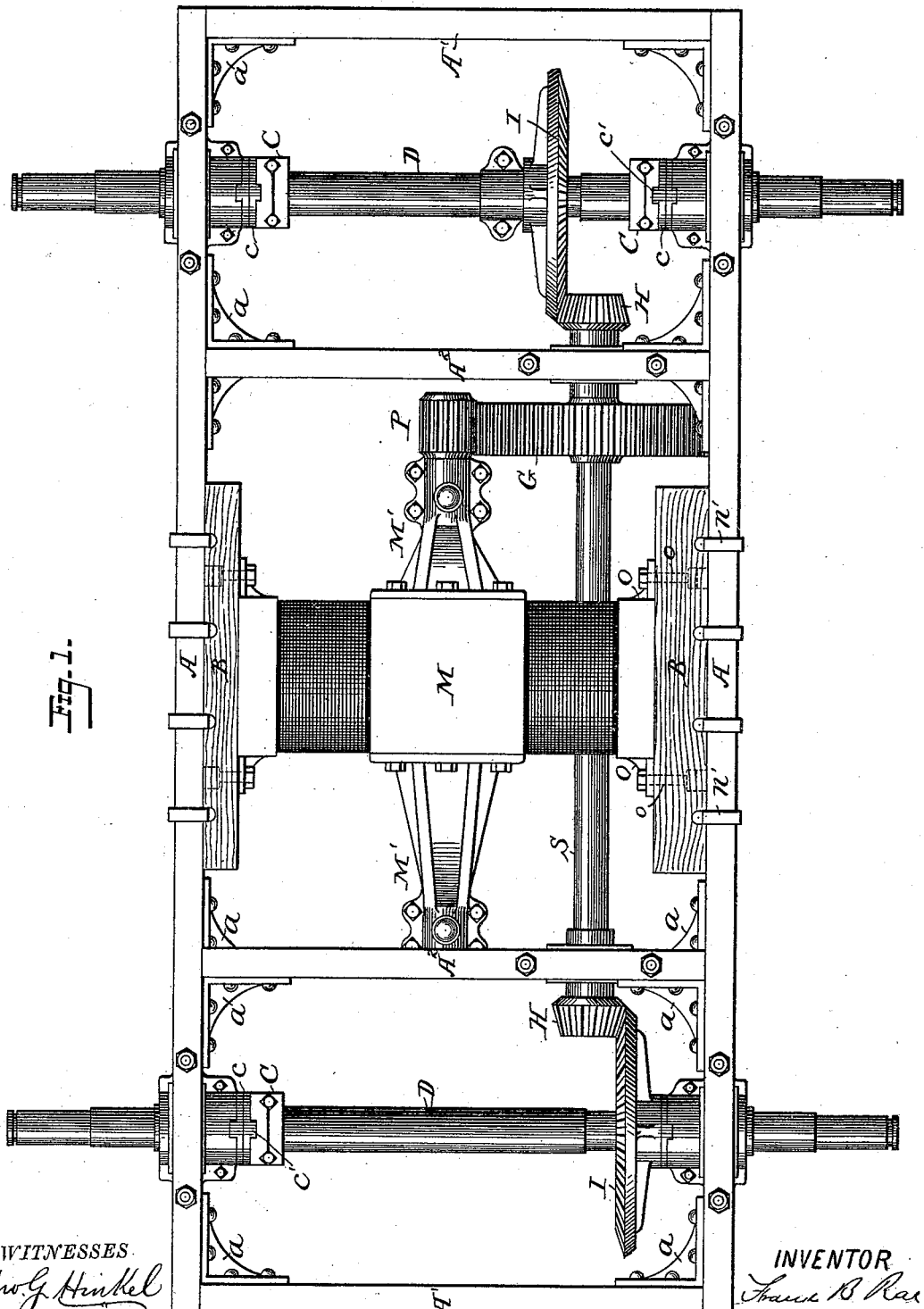

(No Model.)  3 Sheets—Sheet 1.

F. B. RAE.
ELECTRIC LOCOMOTIVE.

No. 491,857. Patented Feb. 14, 1893.

WITNESSES
Jno. G. Hinkel
H. S. McArthur

INVENTOR
Frank B. Rae
by
Foster & Freeman
Attorneys

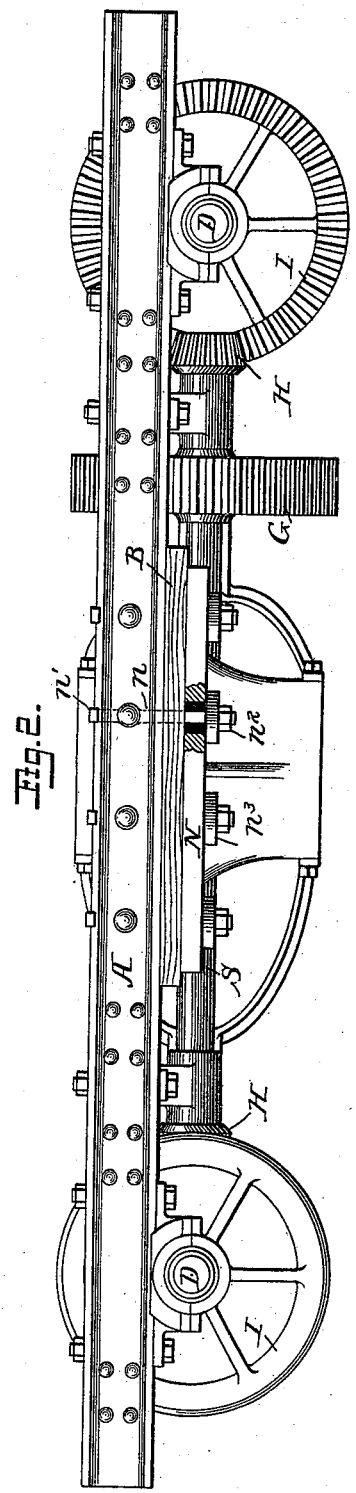

(No Model.) 3 Sheets—Sheet 3.
F. B. RAE.
ELECTRIC LOCOMOTIVE.
No. 491,857. Patented Feb. 14, 1893.
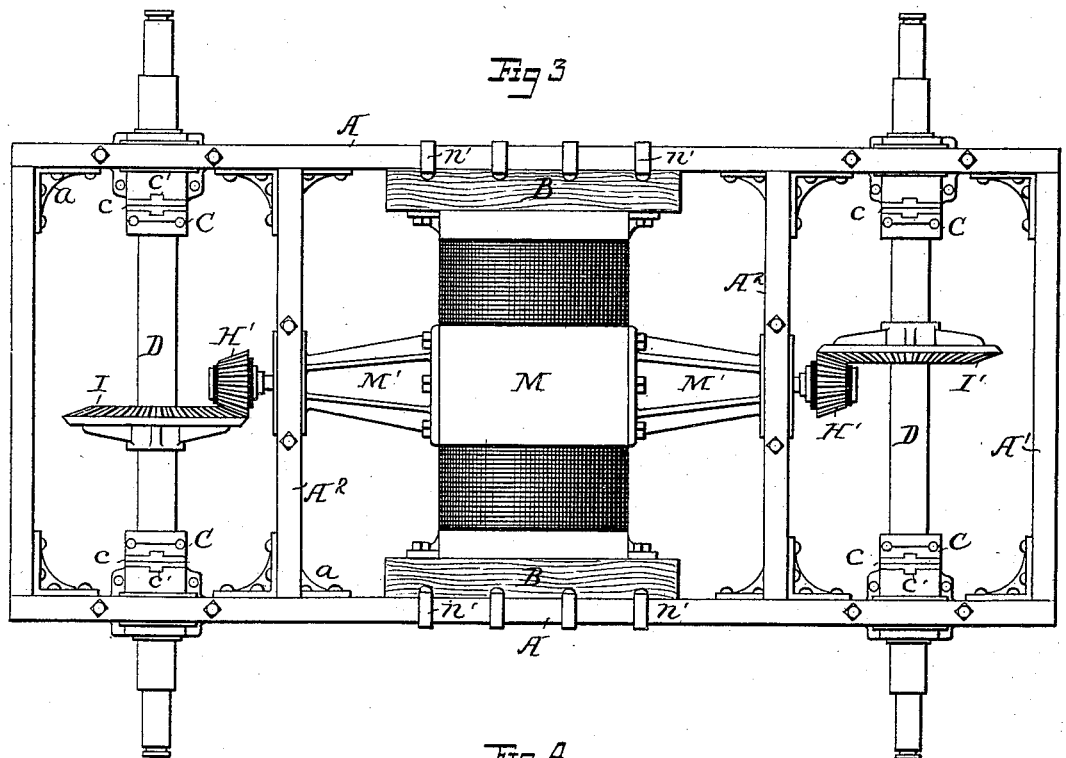
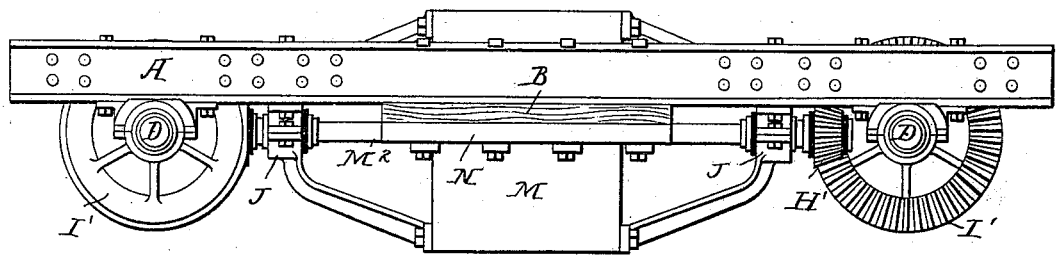
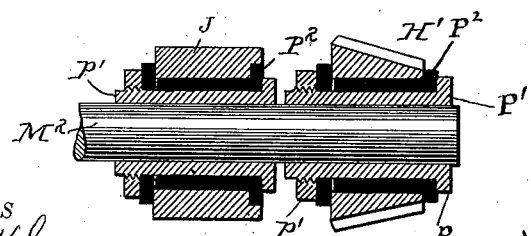
WITNESSES
INVENTOR
Attorney

UNITED STATES PATENT OFFICE.

FRANK B. RAE, OF DETROIT, MICHIGAN, ASSIGNOR TO THE DETROIT ELECTRICAL WORKS, OF SAME PLACE.

ELECTRIC LOCOMOTIVE.

SPECIFICATION forming part of Letters Patent No. 491,857, dated February 14, 1893.

Application filed April 11, 1891. Serial No. 388,468. (No model.)

*To all whom it may concern:*

Be it known that I, FRANK B. RAE, a citizen of the United States, residing at Detroit, in the county of Wayne and State of Michigan, have invented certain new and useful Improvements in Electric Locomotives, of which the following is a specification.

My invention relates to electric locomotives, and more particularly to the manner of mounting and connecting the electric motor to the running gear, and it consists in the novel features of construction and arrangement hereinafter more particularly pointed out.

In the accompanying drawings, Figure 1, is a plan view of a truck frame and axles illustrating my invention; Fig. 2, is a side view of the same; Fig. 3, is a plan view showing a motor geared directly with the axles; Fig. 4, is a side view of Fig. 3; and Fig. 5 is a detail showing one means of insulating some of the parts.

In the construction of electric locomotives, I have found from experience that it is conducive to safety, economy and practicability to connect a single electric motor to both axles of the truck, so that the propelling power shall be evenly distributed to all the wheels of the truck, and thereby greater traction is obtained, as well as smoothness of running and economy in the power. The reasons which have led me to this conclusion need not be fully stated herein, but it is from practical experience that I have arrived at these results, and it is the object of my present invention to provide means whereby these results may be obtained in a more perfect manner, and at the same time in an economical and practical way.

I am aware that it is not new broadly considered to propel both axles of a car from a single shaft driven by the motors, and I do not therefore claim such broad construction.

One of the essential features of an electric locomotive constructed in accordance with my invention, is to provide a practically rigid framework for the truck, and in carrying this out I make a truck frame of wrought iron, preferably of I beams, and securely attach them together. Thus in the drawings A, A are the sides of the frame, A' A' the end pieces, and A², A², the cross pieces joining the sides, all of which are made of wrought iron, or other equivalent rigid material. These parts are securely connected by angle pieces a, preferably attached at all the corners where the two parts of a frame join each other, and are sesured in that position by bolts or rivets, the object being to make the framework as nearly an absolutely rigid frame as it is practicable, and at the same time allow space for the operative parts of the motor and its connections. The frame being of metal it is necessary to provide means whereby the motor will be insulated therefrom in all its connections. This I find to be more essential on account of the disruptive discharges from the motor when the current is suddenly broken, and experience shows that unless the motor is thoroughly insulated from all connecting parts of the truck frame, these discharges which I believe are due to static discharge or secondary currents, will be liable to injure the motor by destroying the insulation thereon, and allowing leakage to earth which if not sufficient to render the motor inoperative, does reduce the effective results from the current.

I mount upon the side rails A, plates or blocks B, B, of insulating material, and while various materials may be used, I have preferably used wooden beams which have been impregnated with some insulating material, for while the wood itself in its dry condition is an exceedingly effective insulator, being mounted on the truck frame beneath the car, it is exposed more or less to moisture and dampness, and it is therefore preferable to so prepare the wood that no moisture can enter the wood or be retained on its surface. These blocks are securely bolted to the sides, and the motor is supported between them. While the motor may be mounted in various ways upon the blocks, I prefer the manner illustrated in the drawings, in which the motor M has the ends of its field magnets provided with flanges N, and also preferably with side projections or feet O, the former of which are arranged to bear on the under surface of the blocks N, while the latter bear upon the inner sides of the blocks. The motor is secured to the blocks by bolts, and I have shown bolts *o* passing through the side projections O, their heads being buried in the wood, and also bolts $n$, the upper ends $n'$ of which are bent over to form hangers resting on the side pieces A, while their other ends pass through openings in the block B, and in the flanges N of the motor from which they are insulated as shown, and on which are suitable nuts and washers $n^2$, $n^3$. In this way it will be seen that the motor is securely insulated from the frame, and at the same time is rigidly mounted therein, so that its proper relation to the frame will always be maintained.

The armature shaft of the motor is mounted in bearings M' secured to the field magnets, and these are made strong and rigid, so as to support the armature shaft under all conditions of strain. On the armature shaft I mount a pinion P, and in order to guard against any possible electric connection between any part of the motor, or the truck frame and its gearing, I insulate this pinion from the armature shaft in any suitable way, as for instance that shown in connection with the beveled gear H' in Fig. 5, wherein this gear H' is shown as consisting of an annular portion having teeth, mounted upon a sleeve P', which is secured to the shaft in any suitable way, and with insulating material $P^2$ between the annular portion and the sleeve, the sleeve being provided with a head $p$, at one end and a screw nut $p'$ at the other end. It will thus be seen that all parts of the motor are thoroughly insulated from all parts of the truck frame, and the danger of disruptive discharges on breaking the circuit of the motor is fully overcome.

In Figs. 1 and 2, I have shown a driving shaft S mounted in the cross pieces $A^2$ of the frame, and carrying a gear wheel G meshing with the pinion P. The ends of this shaft S are provided with beveled pinions H which are arranged to mesh with the beveled gears I, mounted on the axles D, and with this arrangement one of the beveled gears bears upon one side of the beveled pinion of the shaft, while the other beveled gear bears upon the opposite side of the other beveled pinion of the shaft, thereby, causing the axles to rotate in the same direction, and preventing any end thrust on the shaft. This shaft may be mounted in any suitable bearings, but I prefer to use self-lubricating bearings.

In Figs. 3 and 4, I have shown a slightly different arrangement, in which the motor M is a slow speed motor, and the armature shaft $M^2$ is provided with beveled pinions H' which connect directly with the beveled gear I' mounted on the axles D, so that the power of the motor is transmitted directly to the axles, and it will be seen that under this arrangement the beveled gears I' can be mounted nearer the center of the axles, thereby more perfectly balancing the truck, and exerting the power more evenly upon all four of the wheels. In this arrangement, the armature shaft of the motor is mounted in bearings J secured to the cross pieces $A^2$, the bearings being insulated as illustrated in Fig. 5, and in order to carry out the thorough insulation of the motor from all the parts, the beveled pinions H' are also insulated from the shaft in any suitable manner, one simple way being clearly illustrated in Fig. 5. With this last construction which is the preferred form under most circumstances, it will be seen that the motor is centrally mounted in the rigid frame, and connected directly to the axles, and experience has shown that under these conditions there is practically no wear upon the gears, and the relations of the parts when once adjusted may be maintained without serious wear or disarrangement for a long time, and the power of the motor being applied directly to the axles is utilized to its highest efficiency.

While the axles may be mounted in any suitable bearings connected with the rigid frame, I preferably make use of the well known anti-friction bearings, and in order to overcome any lateral wear or friction due to the end thrust on the axle, I provide a collar C which is secured to the axle, and interpose between the collar and the bearing, the rings $c$, $c$, the faces of which are provided with recesses filled with graphite or similar material, and these rings are preferably provided with offsets $c'$, forming corresponding recesses in the bearing and the collar. Thus I provide a substantial and close fitting bearing for the axles which is subject to very light, if any wear, and the collar C can be adjusted on the axle to take up or compensate for any wear, if perchance it occurs.

It will thus be seen that by this construction, I attain the results desired, in that I provide a locomotive truck frame and support thereon the motor and its connections, and connect the axles of the car together in such a manner that they constitute a single rigid structure, and at the same time there is little or no wear or friction between the parts.

What I claim is:

1. In an electric locomotive the combination with a truck frame consisting of metallic side, end and cross pieces united together and provided with metallic angle pieces at the corners to form a rigid structure, of blocks of wood secured to the frame, an electro motor, the field magnets of which are provided with flanges by means of which the motor is attached to said blocks, and insulated from the frame, an armature shaft supported in bearings secured to the cross bars of the frame and provided with beveled pinions, and axles mounted on the side bars of the frame, and each provided with a beveled gear engaging with the beveled pinions of the armature, substantially as described.

2. In an electric locomotive, the combination with a metallic frame, of wooden blocks secured to the sides of the frame, an electric motor secured to the wooden blocks, an armature shaft mounted in insulated bearings in the cross pieces of the frame, axles mounted in the frame, and provided with beveled gear wheels, and beveled pinions mounted on the armature shaft and insulated therefrom and gearing directly with the beveled gears, substantially as described.

In testimony whereof I have signed my name to this specification in the presence of two subscribing witnesses.

FRANK B. RAE.

Witnesses:
W. H. PERRETT,
CHARLES J. STUBBS.